Jan. 30, 1945.   J. W. BOWMAN   2,368,102
APPARATUS AND METHOD FOR THE TREATMENT OF
RUBBER OR RUBBER-LIKE MATERIALS
Filed Oct. 5, 1942   3 Sheets-Sheet 3

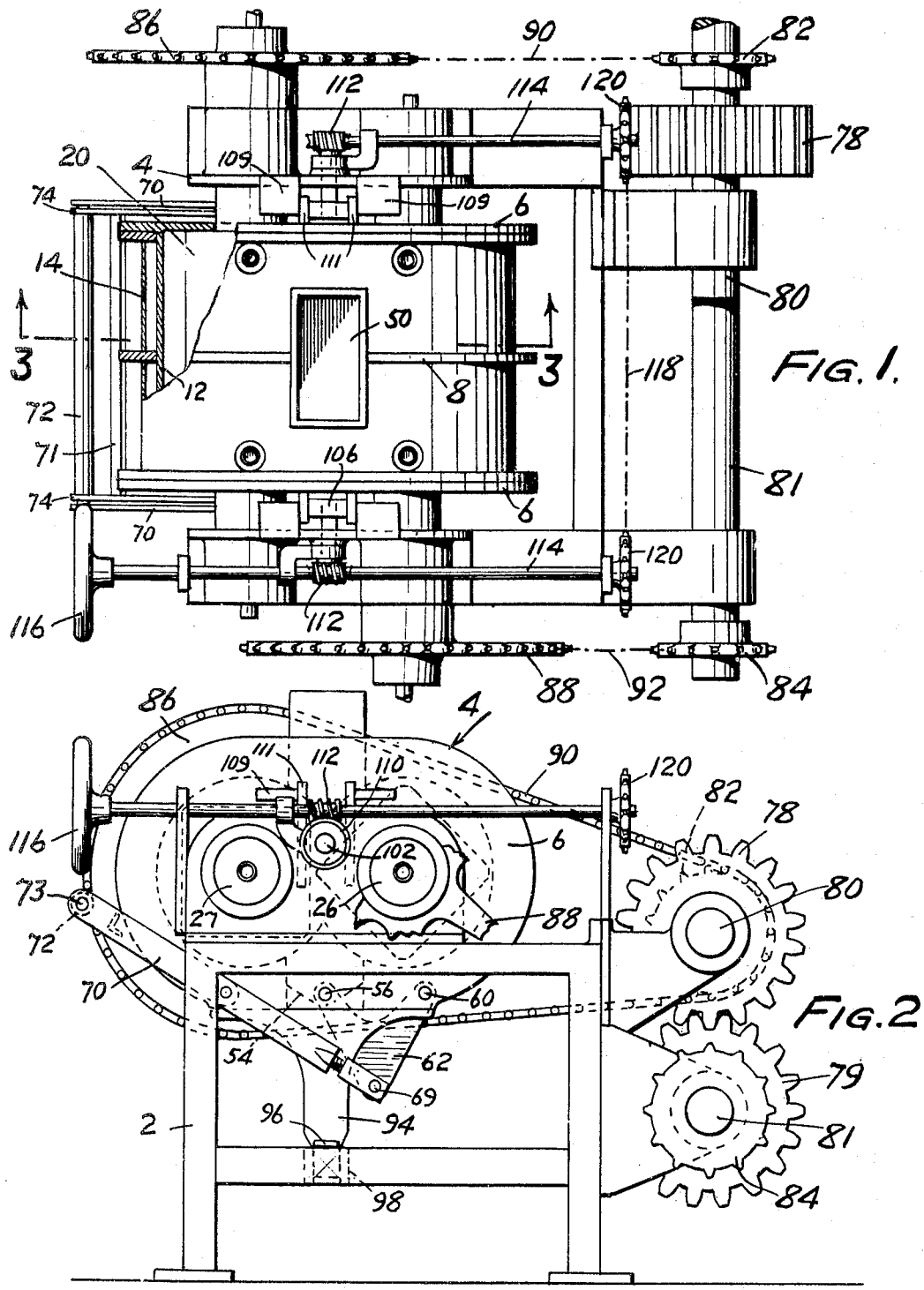

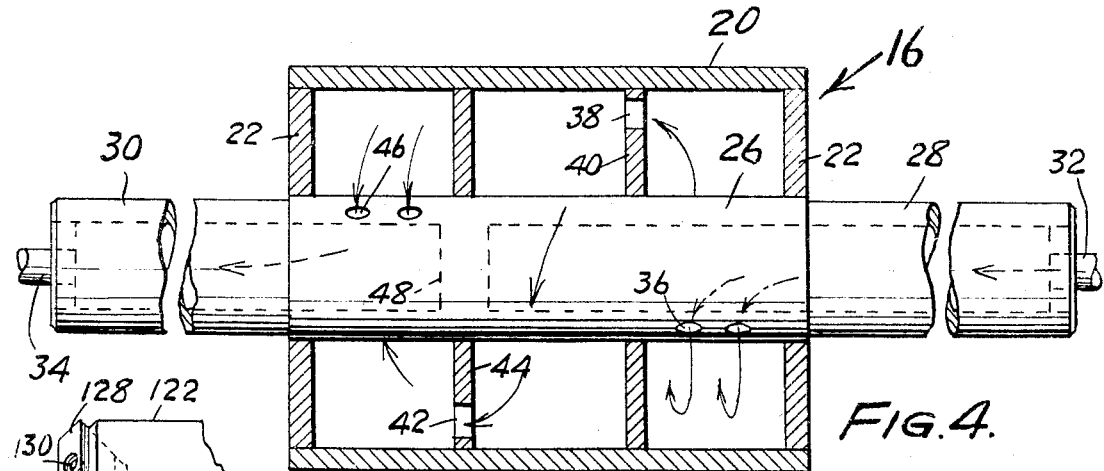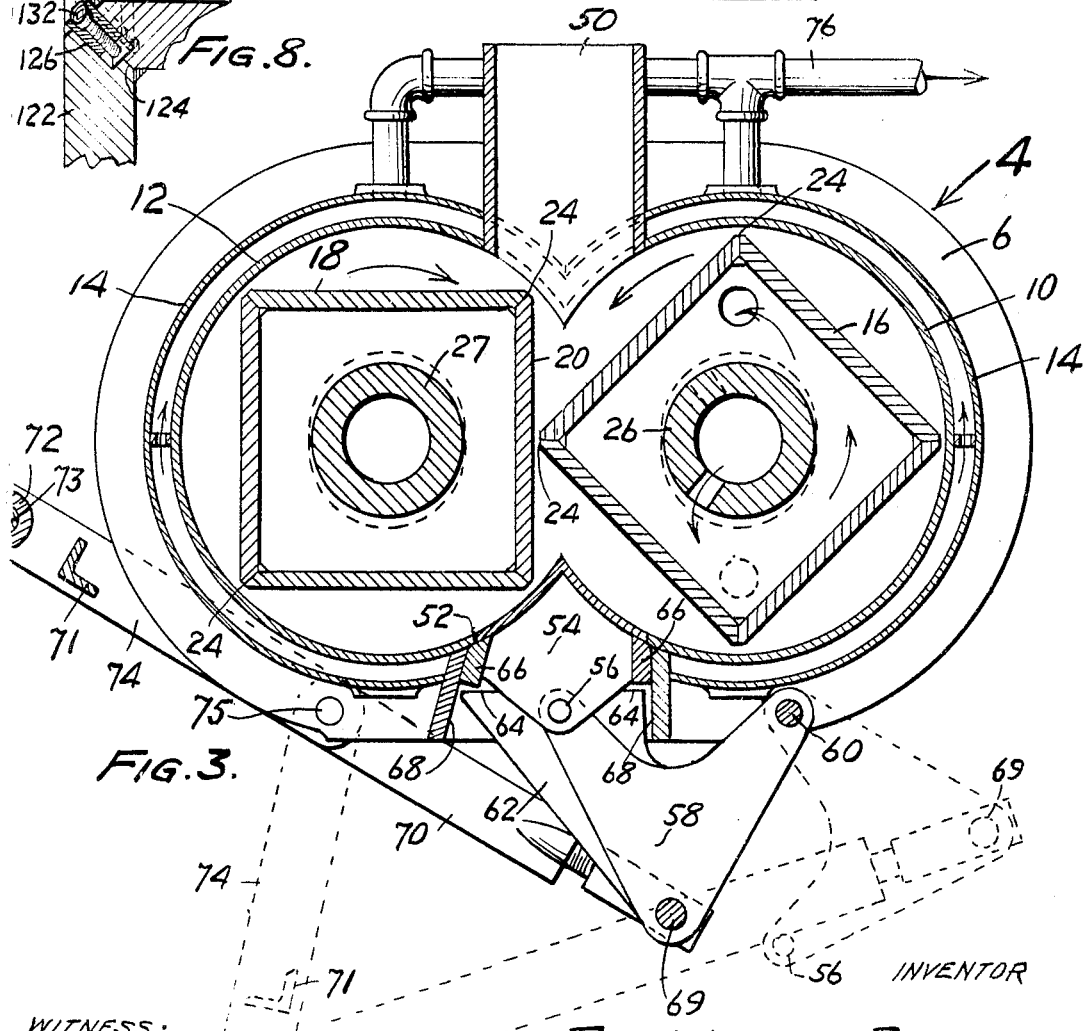

INVENTOR
Jacob Warren Bowman
BY
ATTORNEYS

WITNESS:

Patented Jan. 30, 1945

2,368,102

UNITED STATES PATENT OFFICE 2,368,102

APPARATUS AND METHOD FOR THE TREATMENT OF RUBBER OR RUBBERLIKE MATERIALS

Jacob Warren Bowman, Rydal, Pa., assignor to Bowman Gum, Inc., a corporation of Pennsylvania Application October 5, 1942, Serial No. 460,882

7 Claims. (Cl. 18—2)

This invention relates to a masticator for the treatment of natural or artificial rubber or similar materials which in processing must be subjected to a kneading action. The invention further relates to a method of treatment of such materials.

The masticators heretofore used for the treatment of rubber have in common a provision for the violent distortion of masses of rubber to effect the breaking down action necessary to put the rubber in condition for processing. A milling action between rolls is sometimes used while other devices of this character effect their objectives by extrusion by means of screws or by a tearing action of revolving blades or the like.

It is the broad object of the present invention to provide an apparatus of the type indicated in which a kneading and rolling action occurs which it has been found is very effective in the mastication of rubber or rubber-like materials in a minimum period of time. Unlike some of the devices suitable only for breaking the rubber down, the present apparatus, furthermore, may be used for incorporating in the rubber, either during or subsequent to the breaking down action, other constituents to form desired compositions.

It is the further object of the invention to provide an improved method for the treatment of rubber and rubber-like materials.

These and other objects of the invention, particularly relating to details of construction of an apparatus and to details of the method of treatment will be apparent from the following description read in conjunction with the accompanying drawings, in which:

Figure 1 is a plan view of a preferred form of apparatus embodying the principles of the invention, the apparatus being broken away to show certain interior details;

Figure 2 is a side elevation of the same;

Figure 3 is a vertical section of a portion of the apparatus taken on a plane the trace of which is indicated at 3—3 in Figure 1;

Figure 4 is a sectional view taken through the axis of the shaft of one of the rotary elements;

Figure 8 is a fragmentary perspective view, partially in section, showing an alternative construction of a rotor.

Figure 5:
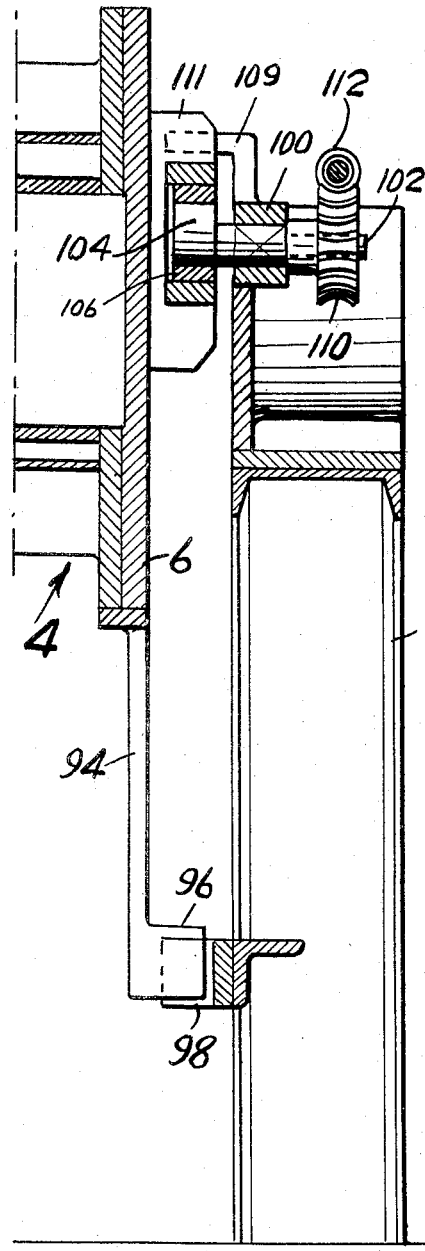
Figure 5 is a fragmentary vertical section showing certain adjustment details.
Figure 6:
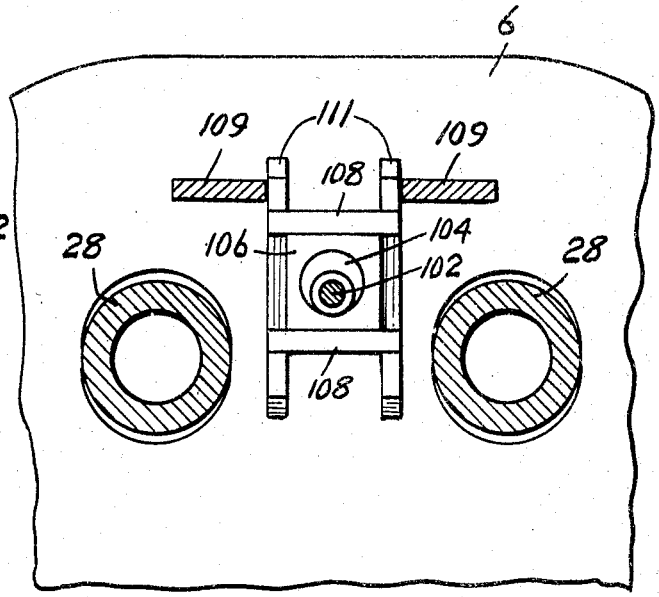
Figure 6 is a vertical sectional view taken at right angles to the section of Figure 5 and showing the same matter.

The apparatus comprises a rigid frame, arranged to support in a fashion hereafter specifically described, the casing 4 in which the treatment of the material takes place. The casing 4 comprises a pair of side walls 6, and a strengthing flange 8 associated with tubular sections 10 and 12, providing a chamber of figure eight form, as illustrated in Figure 3. This chamber is jacketed as indicated at 14.

The various stationary parts of this casing may be secured together by welding, incorporating additional parts which will be described hereafter and which will be evident from the drawings. Within the casing there are arranged to rotate a pair of rotors designated respectively 16 and 18. Each of these rotors is preferably of square cross-section and is made up of rectangular metal plates 20, welded to each other at 24 and to end plates 22 as illustrated in Figure 4. These rotors are mounted upon shafts 26 and 27 having trunnion extensions 28 and 30 arranged to be supported in fixed bearings carried by the frame 2. The shafts 26 and 27 are similar in form and are similarly associated with their rotors as shown in Figure 4, which particularly refers to the rotor 16 and its shaft 26. Each shaft is hollow and is provided at its opposite ends with closure heads through which extend tubes 32 and 34 for the circulation of heating or cooling fluid. The plates 22 of each rotor are welded to its shaft and within each rotor there are located welded diaphragms 40 and 44, provided with openings 38 and 42 desirably located substantially diametrically opposite each other. Each shaft is provided with openings 36 and 46 on opposite sides of a diaphragm 48 within the shaft preventing flow directly therethrough. The openings 36 and 46 are connected respectively with end chambers within each rotor, and are disposed preferably as indicated in Figure 4 so that the flow of heating or cooling fluid takes place inwardly through one end of the shaft and then in succession from the shaft through the several chambers within the rotor and finally into the other end of the shaft to be discharged therefrom, passing in a circuitous course to effect a maximum degree of heat transfer.

The top of the casing is provided with an opening 5 for the introduction of the material which is to be treated. This opening may or may not be provided with a suitable cover, depending entirely upon the process which is being performed.

At the bottom of the apparatus is a discharge opening indicated at 52, designed to be closed by a closure element 54, the inner surfaces of which are provided in the form of continuations of inner cylindrical surfaces of the two parts 10 and 12 of the casing. This closure is provided with a group of flanges through which extends a shaft 56, which also passes through forwardly extending arms of bell cranks 58 and 62, the latter being provided with edges 64, approaching rather closely the transversely extending closure elements 66 of the closure 54, which elements 66 are arranged to fit closely walls 68 flanking the opening 52.

The various bell cranks 58 and 62 have extending through them a common shaft 69 and are mounted upon a common shaft 60 which extends through the walls 6 of the casing where they project beyond the boundaries of the jacket 14. It will be evident that by reason of this arrangement the bell cranks 58 and 62 may swing about the shaft 60 as a common pivot from the position illustrated in full lines in Figure 3 to that illustrated in dotted lines therein. During such movement the closure 54 will be carried therewith, limited in rotation about the shaft 56 by reason of the approach of the walls 66 to the edges 64.

When moved in the reverse direction the bell cranks carry the closure toward its closed position. By reason of the fact that some clearance is provided between parts 64 and 66, the closure in approaching its final position is free to adjust itself to secure proper engagement of the elements 66 and 68 to the proper final position of the closure to tightly close the chamber, its final position being limited by engagement of the walls 66 with the ends of the cylindrical members 10 and 12.

Figure 7:
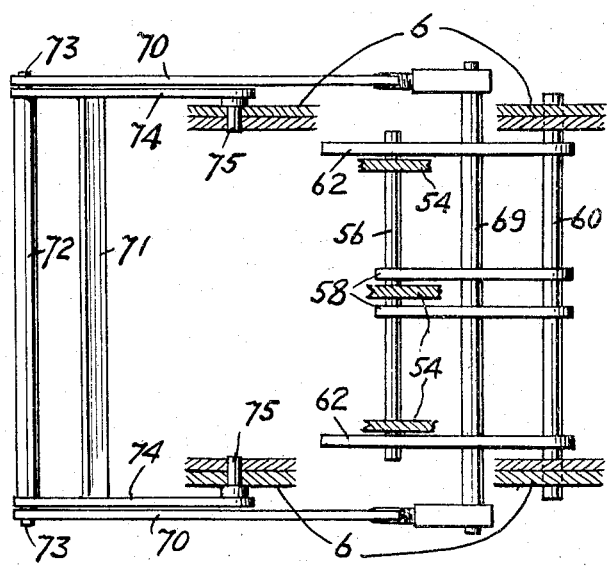
Figure 7 is a diagrammatic sectional view showing primarily a linkage for the closure at the lower portion of the apparatus.

The movements described produce a locking effect by use of the linkage illustrated particularly in Figures 3 and 7. The ends of the shaft 69, which is rotatably mounted on the bell crank elements heretofore described, are secured to links 70 of adjustable length, the outer ends of which are joined by a rod 73 secured thereto and extending through the tube 72 which joins the ends of levers 74 pivoted at 75 within the casing walls, the levers 74 being braced by means of a cross-member 71.

From the figures, it will be evident that a toggle lever system is provided such that, as tube 72 is swung downwardly and the levers 74 swing in a counter-clockwise direction as viewed in Figure 3, the closure 54 is withdrawn and carried to a position clearing opening 52. On the other hand, when the levers 74 are moved in a clockwise direction, the closure is moved to its closed position and at the same time the plane joining the axes of shaft 69 and rod 73 is brought to a position slightly above the axis of the pivots 75, desirably to a position almost coincidental therewith or slightly beyond the dead center. Adjustment to achieve this result may be secured through the adjustability of links 70. As a result the closure is fixedly locked in its closed position to resist any pressure which may be applied in the interior of the apparatus during the action thereof.

For the driving of the apparatus, a shaft 80 is provided at the rear thereof, carrying a gear 78 meshing with another gear 79 of the same size carried by a shaft 81 so that the shafts 80 and 81 rotate in opposite directions at the same rate, the shaft 80 being driven through speed reducing mechanism by a suitable motor.

The shaft 80 carries a sprocket 82 which, through a chain 90, drives the sprocket 86 secured to the shaft 27. Similarly the shaft 81 carries a sprocket 84 which, through chain 92, drives sprocket 88 carried by the shaft 26. The ratios of these sprockets are such that the two shafts 26 and 27 are driven at the same angular velocity and the entire arrangement is such that the edges 24 of the rotors on the two shafts are 45° out of phase.

The casing or housing surrounding the rotors is made vertically adjustable and for this purpose is provided at each side thereof with downward extension 94 carrying a pad 96 slidable in a forked member 98, a member 98 being provided on each side of the machine secured to the frame thereof. The upper portion of the frame is provided on each side thereof with a bearing 100 in which is mounted a short shaft 102, carrying an eccentric 104 located within a circular opening in a block 106 arranged to slide between horizontally extending track members 108 secured to vertical guide members 111 secured to each face 6 of the housing. These members 111 engage fixed flanges 109 carried by the frame and are vertically guided thereby.

Each of the shafts 102 carries a wheel 110 arranged to be driven by a corresponding worm 112 carried by a shaft 114. Each shaft 114 carries a sprocket wheel 120, the sprocket wheels being connected by a chain 118. A hand wheel 116 is provided on a forward extension on one of the shafts 114 and serves for manual simultaneous rotation of the shafts, their worms and the corresponding wheels to produce simultaneous vertical adjustment of the two sides of the housing by movements of the eccentrics 104 in corresponding phase. It will be evident that by reason of this arrangement the casing may be adjusted vertically relative to the rotors which remain in axially fixed positions.

In the operation of the device it is generally desirable that some initial heating be provided by introduction of hot water or steam into the jacket 14, through the pipe connection 76 and into the rotors 16 and 18 through the shaft connections. The connection 76 is made sufficiently flexible to permit the vertical adjustment of the casing.

While the rotors are revolving, the material may be introduced through opening 50, the closure 54 being, of course, locked in closed position through the toggle linkage. The material introduced may, for example, be crepe rubber, which it is desired to submit to a masticating action or it may be artificial rubber or similar product which is to be worked to put it in condition for processing. Alternatively a number of different materials may be introduced to be simultaneously worked and thoroughly mixed as, for example, the various constituents of a chewing gum base.

By reason of the rotation of the rotors 16 and 18, the rubbery material within the casing is subjected to a violent kneading operation which, in the case of the treatment of crepe rubber, rapidly results in its transformation into an elastic product suitable for compounding and further processing. As the action takes place, depending upon the material being treated, a considerable degree of heating may result requiring not only the stoppage of heating, if that was initially provided, but the circulation of a cooling medium such as cold water through the fluid connections to the interiors of the rotors and the jacket 14.

The action which occurs is one highly effective for the mastication of rubber or the like. If, as specifically described, the rotors are square in cross-section and 45° out of phase, it will be evident that the edges of the rotors alternately closely approach the central portion of the sides of each other, effecting in the central portion of the rotors a progressive squeezing action and essential separation of the material in the portions which thereafter are carried about by the edges of the rotors. These edges of the rotors more or less closely approach the cylindrical walls of the casing, and the vertical adjustment referred to may provide very considerable constriction at either the top or the bottom of the apparatus. In any event as the rubbery material is carried around, it is subject to very great friction at the stationary walls as well as at the rotor, and the portions thereof are caused to roll over and over as progress takes place outwardly, upwardly and over the top of the rotor. As the material returns to the region of approach of the two rotors, it is again subjected to a squeezing and separating action followed by repetition of the kneading and rolling action as it is again carried around. As the material is carried around it may be partially held back by friction with the walls of the chamber 50 that it may be squeezed into a following chamber by the rotor edge.

By the use of this apparatus it is found that the time required to break down rubber for processing is very substantially reduced and a complete homogeneous breakdown condition results. When the apparatus is used for mixing, the actions as described above also occur with thorough rapid incorporation of the various constituents together to provide a highly homogeneous product.

Following the completion of the process or mixing, of whatever type is effected, the closure 54 may be opened and the processed material removed whereupon another batch may be introduced and worked.

For the purpose of providing new edges on the rotors and also for the purpose of adjustment of clearances, an arrangement such as illustrated in Figure 8 may be used. The sides of the rotor in this figure are indicated at 122, being welded together along a meeting line 124. A slot 126, milled into the corner, receives the removable edge 128, which is secured therein by countersunk screws 130, tapped into threaded openings in the rotor, the extent to which the edge is drawn inwardly thereby being limited by abutment screws 132, threaded into the edge and abutting the bottom of the milled slot 126. By this arrangement the edges may be replaced and adjusted to extend to different degrees from the axis of rotation, thereby providing suitable adjustment of the clearance between the rotors at their closest approach as well as clearance with the walls of the chambers in which rotation occurs.

While the invention has been described with reference to rotors of square cross-section, it will be evident that other polygonal forms may be used so long as the number of sides is not increased too greatly as to cause a loss of the action which is desired. For example, rotors having five or six sides may be effectively used as well as rotors having three sides of equilateral triangular cross-section. The latter, however, is not so desirable, since it is preferable to restrict the cross-sectional area of the space existing between the cylindrical surface of the casing and the chordally extending faces of the rotors. In the case of polygonal rotors in general it is desirable that the rotors be out of phase to a degree equalling half the central angle substended by each side. This gives rise in each case to a condition such as that resulting in Figure 3 in which a corner of one rotor closely approaches the center of the side of the other with alternation of this action during rotation.

What I claim and desire to protect by Letters Patent is:

1. The method of treating a rubbery material comprising subjecting the same repeatedly to pressure and frictional action in a region of close approach of a corner portion of one substantially polygonal rotating element to a substantially plane surface portion of another similar substantially polygonal element rotating about an axis different from that of the axis of rotation of the first element, the corners of said elements having substantially overlapping paths.

2. The method of treating a rubbery material comprising subjecting the same repeatedly and successively to pressure and frictional action in a region of close approach of a corner portion of one rotating element to a surface portion of another similar element rotating about an axis different from that of the axis of rotation of the first element and with the corners of said elements moving in substanitally overlapping paths, and, within a wedge shaped space defined primarily by two surfaces closely approaching each other at an acute angle not greater than 60°, to the frictional forces resulting on the material to force it towards the apex of said space due to the relative movement of said surfaces in the general direction of one of them.

3. Apparatus for the treatment of rubbery material comprising a pair of adjacent members rotating about substantially parallel axes and each of substantially polygonal radial cross-section, means for simultaneously rotating said members in respective phase relationship to bring alternately edges of one closely adjacent faces having substantially straight line cross-sections of the other, the corners of said elements moving in substantially overlapping paths, and a housing about said members.

4. Apparatus for the treatment of rubbery material comprising a pair of adjacent members rotating about substantially parallel axes and each of substantially polygonal radial cross-section, means for simultaneously rotating said members in respective phase relationship to bring alternately edges of one closely adjacent faces having substantially straight line cross-sections of the other, the corners of said elements moving in substantially overlapping paths, and a housing about said members and having close clearances with their edges.

5. Apparatus for the treatment of rubbery material comprising a pair of adjacent members rotating about substantially parallel axes, each of substantially square radial cross-section and having their corners moving in substantially overlapping paths, and a housing about said members.

6. Apparatus for the treatment of rubbery material comprising a pair of adjacent members rotating about substantially parallel axes, each of substantially square radial cross-section and having their corners moving in substantially overlapping paths, and a housing about said members and having close clearances with their edges.

7. Apparatus for the treatment of rubbery material comprising a pair of adjacent members rotating about substantially parallel axes and each of substantially square radial cross-section, means for simultaneously rotating said members in respective phase relationship to bring alternately edges of one closely adjacent faces of the other, said members having their corners moving in substantially overlapping paths, and a housing about said members.

JACOB WARREN BOWMAN.